United States Patent

[11] 3,583,305

[72] Inventor Erwin Becker
 Munich, Germany
[21] Appl. No. 759,998
[22] Filed Sept. 16, 1968
[45] Patented June 8, 1971
[73] Assignee Agfa-Gevaert Aktiengesellschaft
 Leverkusen, Germany
[32] Priority Sept. 14, 1967
[33] Germany
[31] P1,597,070.4

[54] FILM TRANSPORTING DEVICE FOR PHOTOGRAPHIC CAMERAS
11 Claims, 2 Drawing Figs.
[52] U.S. Cl. .................................................. 95/31, 242/71
[51] Int. Cl. ....................................................... G03b 19/04
[50] Field of Search ........................................... 95/31, 11; 242/71, 71.3

[56] References Cited
UNITED STATES PATENTS

| | | | |
|---|---|---|---|
| 2,245,214 | 6/1941 | Mihalyi | 242/71.3 |
| 2,289,827 | 7/1942 | Crumrine | 95/31 |
| 2,674,931 | 4/1954 | Mihalyi | 95/31 |
| 2,704,969 | 3/1955 | Mische | 242/71.3(X) |
| 2,762,280 | 9/1956 | Lowis | 95/31 |
| 3,096,699 | 7/1963 | Harvey | 95/31 |
| 3,132,574 | 5/1964 | Ernisse | 95/31 |
| 3,148,605 | 9/1964 | Peterson | 95/31 |
| 3,168,025 | 2/1965 | Padelt | 95/31 |

Primary Examiner—Samuel S. Matthews
Assistant Examiner—R. E. Adams
Attorney—Michael S. Striker ABSTRACT: The knob of the film transporting mechanism extends through an opening in the top wall of the housing in a still camera and is rotatable in a cylindrical socket of the housing. The coupling which prevents uncontrolled separation of the knob from the housing comprises a set of equidistant elastic prongs provided on the knob and extending into a circumferential groove of the socket. The knob carries an axially movable key which can rotate the core of the takeup reel, a disc which can operate the frame counter, and a gear which can cooperate with a blocking member serving to arrest the knob upon completed transport of film by the length of a frame. All parts of the knob and those parts which receive motion therefrom are assembled prior to mounting of the knob in the socket. The knob is provided with windows which afford access to the prongs so that the prongs can be expelled from the groove in order to permit separation of the knob.

3,583,305

INVENTOR.

ERWIN BECKER

BY Michael S. Striker
Attorney

FILM TRANSPORTING DEVICE FOR PHOTOGRAPHIC CAMERAS

BACKGROUND OF THE INVENTION

The present invention relates to photographic apparatus in general, and more particularly to improvements in film transporting devices for photographic cameras. Still more particularly, the invention relates to improvements in film transporting devices or mechanisms wherein a knob or a like actuating member must be rotated in order to transport the film lengthwise upon completion of an exposure.

SUMMARY OF THE INVENTION

One of the objects of the present invention is to provide a film transporting device whose parts can be assembled outside of the camera and can be readily mounted in or removed from the housing of the camera.

Another object of the invention is to provide a film transporting device which can be inserted or removed with little loss in time, by resorting to relatively simple tools and without any damage to its parts, even if such insertion or removal is repeated many times.

An additional object of the invention is to provide a film transporting device which can be used in many types of cameras, which occupies little room, which includes a relatively small number of simple parts, and which can be made of readily available lightweight materials.

Still another object of the invention is to provide a camera which embodies the just outlined film transporting device.

The invention is embodied in a photographic camera, preferably a still camera, which comprises a housing, a bearing member provided in the housing, film transporting means including an actuating member, and coupling means movably and separably securing the actuating member to the bearing member by snap action. The coupling means preferably comprises a set of projections in the form of elastic prongs which extend into an annular groove of the bearing member and can be expelled from such groove to permit separation of the actuating member. To this end, the actuating member and/or the bearing member is provided with windows which afford access to the projections so that the projections can be expelled from the groove by resorting to a suitable tool. The actuating member may carry a motion transmitting key which can rotate the core of a takeup reel for film in the housing, a motion receiving disc or the like which is coupled thereto by a spring and can actuate the frame counter or cocks the shutter, and/or a toothed member (e.g., a gear or ratchet wheel) which can cooperate with a blocking member to prevent further rotation of the actuating member when the film transporting mechanism has completed the advance of film by the length of a frame. The actuating member can rotate through 360° or back and forth through an angle of predetermined magnitude.

The novel features which are considered as characteristic of the invention are set forth in particular in the appended claims. The improved film transporting device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
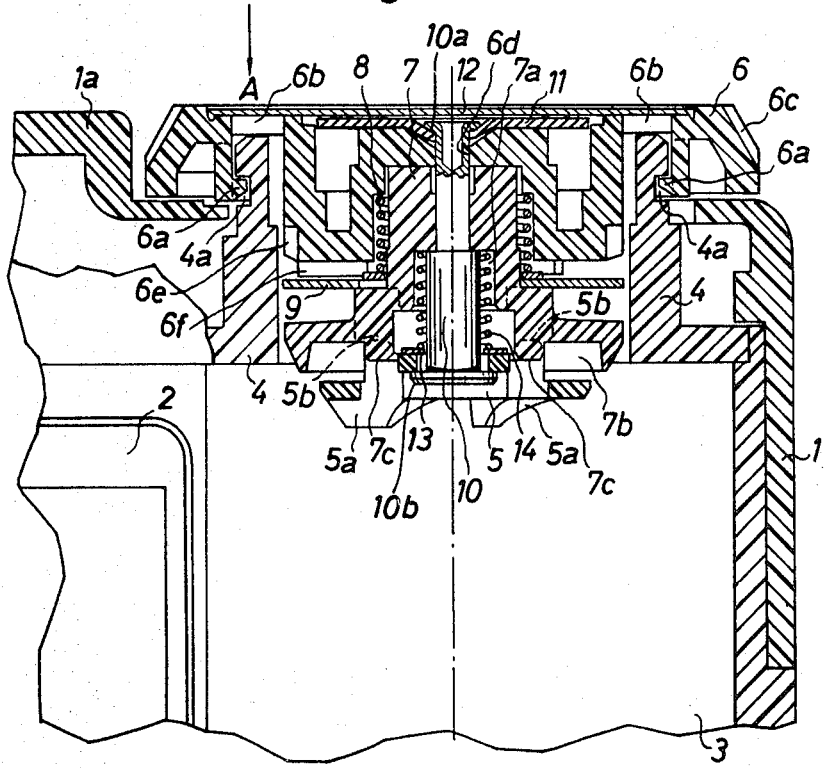
FIG. 1 is a fragmentary longitudinal vertical sectional view of a still camera provided with a film transporting device which embodies one form of the invention.
Figure 2:
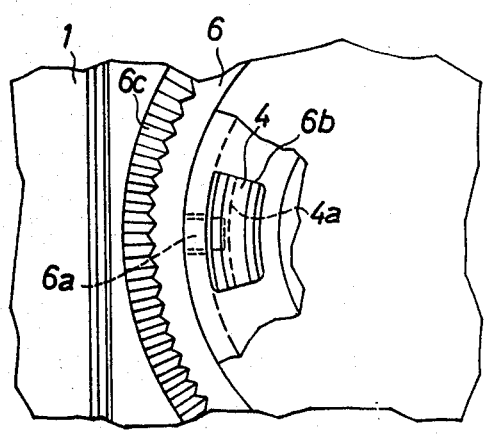
FIG. 2 is a fragmentary plan view of a detail as seen in the direction of arrow A in FIG. 1.

FIGS. 1 and 2 illustrate a portion of a still camera which comprises a housing 1 accommodating a film platform 2 and provided with a chamber 3 for a takeup reel, not shown. The housing 1 includes a fixedly mounted cylindrical bearing member or socket 4 which extends through an opening provided in the top wall 1a and has an external annular groove 4a located at a level above the adjoining portion of the top wall 1a. The socket 4 is substantially coaxial with the takeup reel when the latter is inserted into and properly positioned in the chamber 3. The film transporting mechanism comprises a turnable actuating member which includes two rigidly connected portions, namely, a knob or wheel 6 and a sleeve 7. The sleeve 7 is nonrotatably and coaxially connected with the knob 6 and the actuating member including the parts 6, 7 further carries a motion transmitting element 5 which acts not unlike a key and can rotate the takeup reel in the chamber 3 in response to rotation of the knob 6. The manner in which the knob 6 is assembled with the sleeve 7 and key 5 to form therewith a composite insert which is separably coupled to the bearing member or socket 4 will be described later. The coupling between such insert and the socket 4 includes that (female) portion of the socket 4 which defines the groove 4a and a set of equidistant angularly spaced elastic projections or prongs 6a provided on the knob 6 and arranged to snap into and to then remain in the groove 4a. In order to facilitate detachment of the knob 6, sleeve 7 and key 5 from the socket 4, the knob is preferably provided with a set of windows 6b (one also shown in FIG. 2) which are adjacent to the prongs 6a and enable an operator to apply a suitable spreading tool which can expel the prongs 6a from the groove 4a to thereby permit movement of the knob upwardly and away from the socket 4, as viewed in FIG. 1. In order to return the knob to illustrated position, the insert including the parts 5—7 is simply placed into axial alignment with the socket 4 and is moved downwardly, as viewed in FIG. 1, until the heads of the prongs 6a reenter the groove 4a. Such work is carried out by the person assembling the camera in the manufacturing plant or by a repairman.

When the knob 6 assumes the position shown in FIG. 1, it can be rotated with reference to the socket 4 to rotate the sleeve 7 and the key 5. The aforementioned spreading tool (not shown) is preferably designed in such a way that it can simultaneously expel the entire set of prongs 6a from the groove 4a.

The knob 6 is further provided with an annular knurled or otherwise roughened portion 6c which can be grasped by fingers to facilitate rotation. Still further, the knob 6 has an axial bore 6d for a shaft 10 and comprises a toothed member 6e here shown as a gear which can be engaged by a suitable blocking member (not shown) when the knob 6 is rotated through an angle which suffices to transport the film (not shown) by the length of a frame. Such blocking member is automatically disengaged from the gear 6e when the user completes an exposure; for example, the blocking member can be disengaged by the shutter release so that the knob 6 can be rotated again in order to place a fresh film frame into registry with the platform 2. The knob 6 also carries a disc-shaped cam 6f which can serve as a means for cocking the shutter (not shown) in response to transport of film by the length of a frame. The cam 6f can cooperate directly with the shutter or it can cock the shutter through the intermediary of one or more motion transmitting parts.

The knob 6 is further provided with an internal annular shoulder for one end convolution of a resilient means here shown as a helical spring 8 which bears against a motion receiving friction disc 9 so that the latter is biased axially against a shoulder of the sleeve 7. The friction disc 9 can serve as a part of the frame counter, namely, that part which moves the counter mechanism by a step in response to each manipulation of the knob 6. The arrangement is preferably such that the counter mechanism can advance by a step and thereupon holds the friction disc 9 against rotation even though the knob 6 continues to rotate in a sense to advance the film, i.e., to wind the film onto the takeup reel in the chamber 3. Such transport of film is terminated when the aforementioned blocking member prevents further rotation of the gear 6e.

The sleeve 7 has a bore 7a which accommodates several convolutions of the spring 8 and whose diameter exceeds that of the bore 6d, and a second bore or recess 7b which faces the upper end of the chamber 3 and can accommodate a portion of the key 5. When the insert including the parts 5—7 is being assembled in the factory, the knob 6 is assembled with the sleeve 7, spring 8 and friction disc 9 in a first step. In the next step, the stem of the shaft 10 is inserted from below into the sleeve 7 and into the bore 6d, and a washer 11 is placed into a shallow recess of the knob 6 so that it surrounds the upper end portion of the shaft 10. The upper end portion of the shaft 10 is thereupon upset, as at 10a, so as to insure that the shaft is held against axial movement with reference to the parts 6 and 7. If desired, the washer 11 can be welded, soldered or otherwise permanently secured to the upper end of the shaft 10. The upper end face of the knob 6 is preferably provided with a second shallow recess which accommodates a decorative cap 12 serving to normally conceal the washer 11 and the windows 6b which afford access to the prongs 6a. The cap 12 is to be removed by a repairman.

The shaft 10 has an enlarged lower end portion or head 10b which supports a ring-shaped portion of the key 5. Such ring-shaped portion is biased downwardly by a helical spring 14 which surrounds the shaft 10 in the sleeve 7 and operates between an internal annular shoulder of the sleeve and a ring-shaped retainer 13 which bears against the key 5. Thus, the spring 14 urges the key 5 into the upper end portion of the chamber 3 and into engagement with the upper end of the core in the takeup reel. The key has claws provided with sloping flanks 5a which are engaged by the core of the takeup reel when the latter is being inserted into the chamber 3. Upon completed insertion of the reel, the claws snap into complementary recesses in the core and insure that such core thereupon shares rotary movements of the knob 6 when the knob is rotated in a direction to draw film from the supply reel, past the platform 2 and to wind it onto the core of the takeup reel in the chamber 3. Thus, the claws of the key 5 can engage the core only when such core assumes a predetermined optimum angular position. In order to insure that the shaft 10 rotates with the knob 6, this shaft is preferably provided with splines (not shown) which enter axially parallel flutes in the bore 6d of the knob 6. A similar connection can be provided between the shaft 10 and sleeve 7 and/or between the sleeve 7 and knob 6. If the parts 6, 7 consist of metallic material, they can be soldered to the shaft 10. If the shaft is made of plastic and if the knob 6 and/or sleeve 7 also consists of plastic material, the two plastic parts can be bonded to each other in response to application of heat and pressure. The means for transmitting torque from the knob 6 to the key 5 preferably comprises an axial claw clutch including a first set of clutch elements 7c on the sleeve 7 and a second set of clutch elements 5b on the key 5. These clutch elements remain in torque transmitting engagement with each other in each axial position of the key 5 with reference to the shaft 10.

The structure shown in FIGS. 1 and 2 is susceptible of many modifications without departing from the spirit of the present invention. For example, the knob 6 may be made integral with the sleeve 7 to form therewith a one-piece actuating member which is rotatable in and separable from the bearing member 4. This is particularly advantageous when the friction disc 9 is omitted, for example, because the frame counter is operated by another part of or on the actuating member. The gear 6e and/or the cam 6f can also be omitted or replaced by different operating means, depending on the nature of the shutter and/or the nature of the film transporting mechanism. Moreover, the portion 6 and/or 7 of the actuating member can be provided with one or more additional gears, cams, projections, arms, lobes or analogous operating or motion transmitting means which can cooperate with various mechanisms in the camera.

It is further possible to use the knob 6 as a rapid winding device for the film, for example, a winding device of the type which is rotated back and forth not unlike the spring winding wheel of a wrist watch. This can be achieved as follows: The knob 6 then transmits rotation to a sprocket or the like by way of a one-way clutch and is preferably mounted on the socket 4 in such a way that it can turn back and forth through angles of predetermined magnitude. The magnitude of such angles can be determined by a set of arcuate grooves which replace the circumferentially complete groove 4a of the bearing member 4. It is further clear that the prongs 6a can be replaced by prongs on the sleeve 7, i.e., that the insert including the parts 5—7 can be mounted in the bearing member 4 by establishing a separable connection between the bearing member and the sleeve 7. It is also clear that the insert 5—7 or the shaft 10 can rotate one or more sprockets (not shown) which engage the perforations of film to move the film lengthwise.

If desired or necessary, the knob 6 and the sleeve 7 can be separably secured to each other by a coupling which is similar to the coupling between the knob 6 and bearing member 4, i.e., by snap action. The same applies for the connection between the knob 6 and/or sleeve 7 on the one hand and the part 6e and/or 6f on the other hand. However, the aforedescribed construction is preferred at this time because all parts which rotate with the knob 6 can be assembled into an insert prior to coupling of such insert with the bearing member 4. The attachment of such insert to the bearing member 4 necessitates the exertion of negligible force and is completed in no time. The separation also requires very little time, particularly if it is carried out by a suitable tool which can be produced for the express purpose of detaching the knob 6 from the bearing member 4.

What is claimed as new and desired to be protected by Letters Patent is set forth in the appended claims.

I claim:

1. In a photographic camera, a combination comprising a housing; a bearing member provided in said housing; film transporting means including a rotary actuating member; coupling means rotatably attaching said actuating member to said bearing member by snap action so that the actuating member is held against appreciable axial movement relative to said bearing member, said coupling means comprising a male coupling portion provided on one of said members and a female coupling portion provided on the other member, one of said coupling portions being elastic and being movable radially of said actuating member; and deforming means forming a part of said camera for temporarily deforming said elastic coupling portion radially of said actuating member during attachment of said actuating member to said bearing member whereupon said elastic coupling portion is free to assume an at least partially undeformed condition with resulting entry of said male coupling portion into said female coupling portion radially of said actuating member in a predetermined axial position of said actuating member to thereby positively hold said actuating member against appreciable axial movement from said predetermined axial position but to permit rotation of said actuating member in said predetermined axial position.

2. A combination as defined in claim 1, wherein said male coupling portion comprises elastic projections and said female coupling portion has a groove for said projections.

3. A combination as defined in claim 2, wherein said projections are provided on said actuating member.

4. A combination as defined in claim 1, further comprising a motion transmitting member operatively connected with said actuating member to rotate the core of a reel in said housing in response to rotation of said actuating member.

5. A combination as defined in claim 1, further comprising a toothed member arranged to rotate with said actuating member and to cooperate with means for blocking rotation of said actuating member upon completed transport of film by the length of a frame.

6. A combination as defined in claim 1, further comprising shutter cocking means arranged to rotate with said actuating member.

7. A combination as defined in claim 1, wherein said actuating member comprises a plurality of components which together form a unit and are rotatable with reference to said bearing member.

8. A combination as defined in claim 1, wherein said housing comprises a wall provided with an opening and said bearing member is a cylinder which is adjacent to said opening, said actuating member comprising a first portion constituting a knob and being outwardly adjacent to said opening and a second portion extending through said opening and into said bearing member, said female coupling portion having an annular groove provided in said bearing member and said male coupling portion having elastic projections provided on one portion of said actuating member and extending into said groove.

9. In a photographic camera, a combination comprising a housing; a bearing member provided in said housing; film transporting means including an actuating member; and coupling means movably and separably securing said actuating member to said bearing member by snap action, said coupling means comprising elastic projections provided on one of said members and extending into a groove provided in the other member, at least one of said members being provided with window means affording access to said projections to permit expulsion of said projections from said groove.

10. In a photographic camera, a combination comprising a housing; a bearing member provided in said housing; film transporting means including an actuating member; coupling means rotatably and separably securing said actuating member to said bearing member by snap action, said coupling means comprising elastic projections provided on one of said members and extending into a groove provided in the other member; a motion transmitting member operatively connected with said actuating member to rotate the core of a reel in said housing in response to rotation of said actuating member, said motion transmitting member being movable axially of said actuating member; and means for biasing said motion transmitting member in one axial direction.

11. In a photographic camera, a combination comprising a housing; a bearing member provided in said housing; film transporting means including an actuating member; coupling means rotatably and separably securing said actuating member to said bearing member by snap action, said coupling means comprising elastic projections provided on one of said members and extending into a groove provided in the other member; a motion receiving member coaxial with said actuating member; and resilient means for biasing said motion receiving member axially against said actuating member so that said motion receiving member rotates with said actuating member when such rotation is not opposed by a force which exceeds the bias of said resilient means.